P. C. HEWITT.
AUTOMATIC STARTING DEVICE FOR VAPOR LAMPS.
APPLICATION FILED MAY 2, 1903.

1,064,690.

Patented June 10, 1913.

Witnesses:
Tho. H. Brown, Jr.
W. H. Capel

Inventor
Peter Cooper Hewitt
by Charles A. Terry. Atty

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

AUTOMATIC STARTING DEVICE FOR VAPOR-LAMPS.

1,064,690.   Specification of Letters Patent.   Patented June 10, 1913.

Application filed May 2, 1903. Serial No. 155,309.

*To all whom it may concern:*

Be it known that I, PETER COOPER HEWITT, a citizen of the United States, and resident of New York, county of New York, State of New York, have invented certain new and useful Improvements in Automatic Starting Devices for Vapor-Lamps, of which the following is a specification.

In my application Number 52,488, filed March 23, 1901, it has been proposed, among other things, to start a gas or vapor electric apparatus of the character described, for example, in some of its embodiments in certain patents issued to me September 17, 1901, by automatically establishing at the negative electrode, a local flow of current. Such a flow once started, will under proper conditions be sufficient to cause a flow of current through the entire gas or vapor apparatus from the positive to the negative electrode. In explanation of this action it may be said that one of the chief obstacles to the flow of current from the positive to the negative electrode in the first instance, is the existence at the negative electrode of what has been called a negative electrode reluctance. On a breaking down of this reluctance, whether by an impulse of higher potential impressed upon the electrodes, as described in some of the above patents, or by establishing a local flow of current at the electrode, as set forth herein and in my application above referred to, the current which is tending to flow from the positive to the negative electrode will actually start and be maintained.

The present invention relates to a novel mode of establishing the local flow of current automatically, as will appear from the specification which follows.

Figure 1:
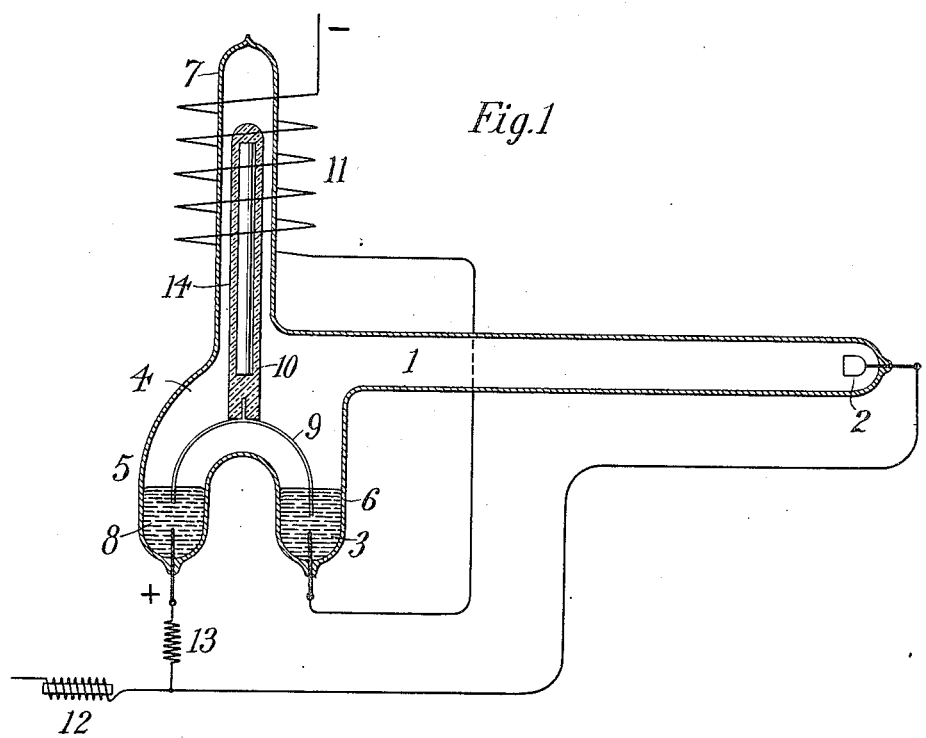
Figure 2:
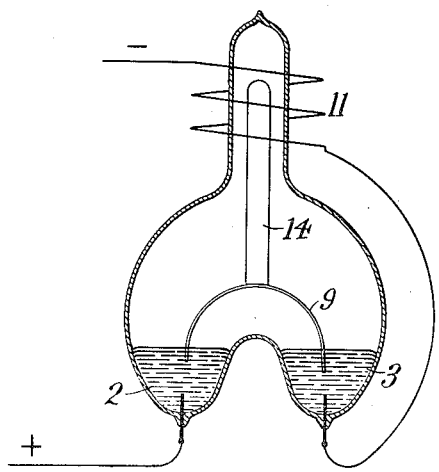

In the drawings, Figure 1 illustrates in elevation one form of gas or vapor electric apparatus having my improvements applied thereto; and Fig. 2 shows a modification.

In the drawings, 1 is the container of an apparatus of this class, and 2 and 3 are, respectively, the permanent positive and negative electrodes thereof. The positive electrode may be of iron, mercury or any other suitable material and the negative electrode is of some volatilizable substance, such as mercury. In the present instance the electrode 2 is represented as being of iron or some other suitable solid substance and the electrode 3 is represented as a small mass or puddle of mercury.

In the embodiment illustrated in Fig. 1, I construct at one end of the tubular container a chamber or enlargement, 4, provided with pockets, 5 and 6, and with an extension 7. The pocket 6 contains mercury constituting the permanent negative electrode, and pocket 5 also contains mercury (shown at 8) which, for the purposes of the present invention, is a temporary positive electrode.

Into the mercury puddles 3 and 8 dip the ends of a metallic strip, 9, preferably of platinum. The said strip is suitably connected to the lower end of a rod, 10, the upper end of which passes into the extension 7. All or a part of this rod is formed of magnetic material, and is adapted to be acted upon by the coil 11 surrounding the extension 7. When the said coil is energized the rod is lifted and carries with it the strip 9, thus breaking contact between the ends of the said strip and the surfaces of the mercury puddles 3 and 8. When the rod 10 is made of material which might give off injurious gases in the operation of the device, I prefer to inclose the said armature in glass or other inert material, as shown at 14. Such sealing, for the same purpose, may extend to the strip 9, except that the ends of the strip should be left bare for making good contact with the mercury. The strip 9 in combination with the mercury puddles into which its ends dip may be regarded as a switch which is operated by the coil 11.

The apparatus may be connected in circuit by running the negative side of the circuit through the coil 11 to the negative electrode 3, and by running the positive side of the circuit both to the permanent positive electrode 2 and to the temporary positive electrode 8.

I may interpose in the common positive wire, or at any other suitable point in the circuit, an inductance device 12, and in the branch to the electrode 8 a resistance 13.

When the main circuit is first closed, current will pass through the said inductance device and resistance to the temporary positive electrode 8, thence by way of the strip 9 to the negative electrode 3 and thence back through the coil or solenoid 11. The latter, becoming energized, will lift the rod 10 and the strip 9, until the ends of the strip are moved away from the surfaces of the electrodes. Thereupon arcs will be formed between the strip ends and the said surfaces, which will, in practice, result in a local flow of current directly across between the electrodes 3 and 8. Thereupon, it is found that a flow of current immediately begins between the electrodes 2 and 3, and this flow will continue so long as the conditions for such flow remain favorable.

In Fig. 2, there is no supplemental positive electrode, but the strip 9 initially connects the two permanent electrodes of the apparatus. On the lifting of the rod 10, the negative electrode reluctance is broken down, and current begins to flow, as already described.

In order to facilitate the establishment of the local current, I cause one end of the strip to dip farther into its electrode than the other, whereby the rupture takes place first at one end or point of the strip and afterward at the other point or end. I prefer usually to have the contact broken at the positive end 5 of the conductor 9.

I claim as my invention:

1. The combination with a gas or vapor electric apparatus comprising a conducting gas or vapor, a positive electrode and a negative electrode therefor, of a continuous conductor between the positive and the negative electrode, and starting means consisting of means for separating the said conductor from both electrodes.

2. The combination with a gas or vapor electric apparatus comprising a conducting gas or vapor, a positive and a negative electrode therefor, of a continuous conductor between the positive and the negative electrode, and automatic starting means consisting of means for separating the said conductor from both electrodes.

3. The combination with a gas or vapor electric apparatus comprising a conducting gas or vapor, a positive electrode and a negative electrode therefor, of a continuous conductor between the positive and the negative electrodes, and automatic means for successively separating the said conductor from both electrodes.

4. The combination with a gas or vapor electric apparatus comprising a conducting gas or vapor, a positive electrode and a negative electrode therefor, of a continuous conductor between the positive and the negative electrodes, and electro-magnetic means for successively separating the said conductor from both electrodes.

5. The combination with a gas or vapor electric apparatus comprising a conducting gas or vapor, a positive and a negative electrode therefor, of a continuous conductor between the positive and the negative electrodes, and automatic means for separating the said conductor from both electrodes, the rupture of the positive electrode taking place prior to that at the negative.

6. The combination with a gas or vapor electric apparatus comprising a conducting gas or vapor, a positive electrode and a negative electrode therefor, of a continuous conductor between the positive and the negative electrodes, and electro-magnetic means for successively separating the said conductor from both electrodes, the rupture of the positive electrode taking place prior to that at the negative electrode.

7. The combination of an exhausted envelop or chamber, electrodes therefor, one at least of which is adapted to emit vapor, a conducting bridge within the envelop electrically connecting the electrodes and means responsive to current through said bridge for interrupting contact of said bridge at a vapor emitting electrode.

8. The combination of an exhausted envelop or chamber, electrodes therefor, one at least of which is adapted to emit vapor, a conducting bridge within the envelop electrically connecting the electrodes, and means responsive to current through said bridge for interrupting contact of said bridge at the vapor emitting electrode.

9. The combination with a completely exhausted container, a main anode and a vaporizable cathode therein, of an additional anode and a solid conductor connecting the last named electrodes inside the container, together with means for separating the said solid conductor from both electrodes.

10. The combination with a completely exhausted container, a main anode and a mercury cathode therein, of an additional anode of mercury, and a solid conductor connecting the last named electrodes within the container, together with means for separating the said solid conductor from both electrodes.

11. The combination with a completely exhausted container, a main anode and a vaporizable cathode therein, of an additional anode and a metallic strip connecting the last named electrodes inside the container, together with means for separating the said metallic strip from both electrodes.

12. In a vapor electric apparatus, the combination of a plurality of mercury electrodes, a conductor initially connecting said electrodes and means for dissimultaneously breaking the connections at the working surfaces of the respective electrodes.

Signed at New York, in the county of New York, and State of New York, this 30th day of April A. D. 1903.

PETER COOPER HEWITT.

Witnesses:
 WM. H. CAPEL,
 GEORGE H. STOCKBRIDGE.